US010069550B2

(12) United States Patent
Jeong et al.

(10) Patent No.: US 10,069,550 B2
(45) Date of Patent: Sep. 4, 2018

(54) METHOD AND APPARATUS FOR GENERATING AND REPORTING FEEDBACK INFORMATION IN MOBILE COMMUNICATION SYSTEM

(71) Applicant: Samsung Electronics Co., Ltd., Gyeonggi-do (KR)

(72) Inventors: Sang-Soo Jeong, Gyeonggi-do (KR); Sang-Min Ro, Seoul (KR); Kyeong-In Jeong, Gyeonggi-do (KR); Hyo-Jin Lee, Gyeonggi-do (KR); Yong-Jun Kwak, Gyeonggi-do (KR); Dong-Han Kim, Gyeonggi-do (KR); Sang-Bum Kim, Gyeonggi-do (KR); Soeng-Hun Kim, Gyeonggi-do (KR); Youn-Sun Kim, Gyeonggi-do (KR); Jae-Hyuk Jang, Gyeonggi-do (KR); Song-Yean Cho, Seoul (KR); Hyoung-Ju Ji, Seoul (KR); Young-Woo Kwak, Gyeonggi-do (KR); Hoon-Dong Noh, Gyeonggi-do (KR); Cheol-Kyu Shin, Gyeonggi-do (KR); Ju-Ho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/517,431

(22) PCT Filed: Oct. 6, 2015

(86) PCT No.: PCT/KR2015/010572
§ 371 (c)(1),
(2) Date: Apr. 6, 2017

(87) PCT Pub. No.: WO2016/056832
PCT Pub. Date: Apr. 14, 2016

(65) Prior Publication Data
US 2017/0302346 A1    Oct. 19, 2017

Related U.S. Application Data

(60) Provisional application No. 62/060,233, filed on Oct. 6, 2014.

(51) Int. Cl.
*H04B 7/0456* (2017.01)
*H04B 7/06* (2006.01)

(52) U.S. Cl.
CPC ......... *H04B 7/0478* (2013.01); *H04B 7/0623* (2013.01); *H04B 7/0626* (2013.01)

(58) Field of Classification Search
CPC .. H04B 7/0478; H04B 7/0623; H04B 7/0626; H04B 7/06
(Continued)

(56) References Cited

U.S. PATENT DOCUMENTS

2006/0153060 A1* 7/2006 Cho .................. H04B 7/0619
370/208
2011/0170435 A1    7/2011 Kim et al.
(Continued)

FOREIGN PATENT DOCUMENTS

KR    1020140057005    5/2014

OTHER PUBLICATIONS

PCT/ISA/210 Search Report issued on PCT/KR2015/010572 (pp. 3).
(Continued)

*Primary Examiner* — Michael Neff
(74) *Attorney, Agent, or Firm* — The Farrell Law Firm, P.C.

(57) ABSTRACT

Disclosed are: a communication technique for fusing, with IoT technology, a 5G communication system for supporting a data transmission rate higher than that of a 4 G system and subsequent systems; and a system thereof. The present disclosure can be applied to an intelligent service (for
(Continued)

example, smart home, smart building, smart city, smart car or connected car, health care, digital education, retail business, security and safety-related service and the like) based on 5G communication technology and IoT related technology. The present disclosure presents a method by which a base station determines the approximate location of a terminal on the basis of a reception power report, and sets a codebook subset on the basis of the approximate location of the terminal so as to reduce a channel state report burden.

16 Claims, 8 Drawing Sheets

(58) Field of Classification Search
USPC .......................................... 375/267
See application file for complete search history.

(56) References Cited

U.S. PATENT DOCUMENTS

| | | |
|---|---|---|
| 2012/0213109 A1 | 8/2012 | Xu et al. |
| 2013/0039199 A1 | 2/2013 | Liao et al. |
| 2014/0219167 A1 | 8/2014 | Santhanam et al. |
| 2015/0288497 A1 | 10/2015 | Li et al. |
| 2016/0065290 A1* | 3/2016 | Zhu .................. H04W 52/0209 370/329 |

OTHER PUBLICATIONS

PCT/ISA/237 Written Opinion issued on PCT/KR2015/010572 (pp. 5).
3GPP TSG-RAN WG4 #62bis, Jeju, Korea, Mar. 26-30, 2012, Evaluation aspects of signal quality measurements for CoMP, pp. 9.

* cited by examiner

METHOD AND APPARATUS FOR GENERATING AND REPORTING FEEDBACK INFORMATION IN MOBILE COMMUNICATION SYSTEM

PRIORITY

This application is a National Phase Entry of PCT International Application No. PCT/KR2015/010572, which was filed on Oct. 6, 2015, and claims priority to U.S. Provisional application No. 62/060,233, which was filed on Oct. 6, 2014 in the U.S. Patent and Trademark Office, the contents of each of which are incorporated herein by reference.

TECHNICAL FIELD

The present disclosure relates to a method and apparatus for generating and reporting feedback information in a mobile communication system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, the implementation of the 5G communication system in a mmWave band (for example, 60 GHz band) has been considered. In the 5G communication system, technologies, such as beamforming, massive MIMO, Full Dimensional MIMO (FD-MIMO), array antenna, analog beam-forming, and large scale antenna are discussed to mitigate a propagation path loss in the mm Wave band and to increase a propagation transmission distance. Further, the 5G communication system has developed technologies, such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network. In addition, the 5G system has developed advanced coding modulation (ACM) schemes, such as hybrid FSK and QAM modulation (FQAM) and sliding window superposition coding (SWSC), and advanced access technologies, such as filter bank multi carrier (FBMC), non orthogonal multiple access (NOMA), and sparse code multiple access (SCMA).

Meanwhile, the Internet has been evolved to the Internet of Things (IoT) network that exchanges and processes information between distributed components, such as objects and the like, in a human-oriented connection network in which humans generate and consume information. Also, the Internet of Everything (IoE) technology implemented by coupling the IoT technology and a big data processing technology through a connection with a cloud server or the like. In order to implement IoT, technical factors, such as a sensing technique, wired/wireless communication, network infrastructure, service interface technology, and security technology are required, and thus, research has been conducted on technologies such as a sensor network, machine to machine (M2M), machine type communication (MTC), and the like for a connection between objects. In an IoT environment, through the collection and analysis of data generated from connected objects, an intelligent Internet technology (IT) service to create a new value for the human's life may be provided. IoT may be applied to fields, such as a smart home, smart building, smart city, smart car or connected car, smart grid, health care, smart home appliance, or high-tech medical service, through the convergence of the conventional Information technology (IT) and various industries.

Accordingly, various attempts to apply the 5G communication to the IoT network are made. For example, the 5G communication technology, such as a sensor network, a machine to machine (M2M), a machine type communication (MTC), or the like, is embodied by beamforming, MIMO, and array antenna scheme, or the like. The application of a cloud RAN as the big data processing technology may be an example of the convergence of the 5G technology and the IoT technology.

From the early stage of providing voice-oriented services, a mobile communication system has evolved into a high-speed, high-quality wireless packet data communication system to provide data and multimedia services. To this end, various standardization organizations such as 3GPP, 3GPP2, IEEE, and the like have been working on the standardization of the $3^{rd}$ evolved mobile communication system to which a multiple access scheme that uses a multi-carrier is applied. Recently, various mobile communication standards such as long term evolution (LTE) of 3GPP, ultra mobile broadband (UMB) of 3GPP2, 802.16m of IEEE, and the like have been developed to support a high-speed and high-quality wireless packet data transmission service based on the multi-access scheme using a multi-carrier.

The existing 3G evolved mobile communication system, such as LTE, UMB, 802.16m, and the like, is based on a multi-carrier multiple access scheme, may apply multiple input multiple output (MIMO) to improve the transmission efficiency, and may use various technologies, such as beamforming, an adaptive modulation and coding (AMC) method, a channel sensitive scheduling method, and the like. The various technologies may enhance the transmission efficiency and improve the system throughput through a method of concentrating a transmission power that is transmitted from multiple antennas or adjusting an amount of transmitted data based on a channel quality or the like, and selectively transmitting data to a user having a good channel quality, or the like.

Most of those schemes are operated based on channel status information of a channel between an evolved node B (eNB) (or Base station (BS)) and a user equipment (UE) (or a Mobile Station (MS)), and thus, the eNB or the UE may need to measure a channel status between the eNB and the UE. In this instance, a channel status indication reference signal (CSI-RS) is used. The eNB indicates a downlink transmission and uplink reception device located in a predetermined place, and a single eNB performs a transmission/reception in association with a plurality of cells. In a single mobile communication system, a plurality of eNBs are geographically distributed, and each eNB performs a transmission/reception in association with a plurality of cells.

The existing $3^{rd}$ and $4^{th}$ mobile communication system, such as, LTE, LTE-A, or the like, utilizes the MIMO technology that executes transmission using a plurality of transmitting and receiving antennas to improve the data transmission rate and the system throughput. The MIMO technology utilizes a plurality of transmitting and receiving antennas in order to spatially separate a plurality of information streams when the information streams are transmitted. Transmitting the plurality of information streams to be spatially separated is referred to as spatial multiplexing. Generally, the number of information streams to which spatial multiplexing is to be applied may vary based on the number of antennas included in a transmitter and a receiver. Generally, the number of information streams to which spatial multiplexing is to be applied is referred to as a rank of a corresponding transmission. In the case of the MIMO technology supported in the standards up to LTE/LTE-A Release 11, spatial multiplexing with respect to the case in which the number of transmission antennas and the number of reception antennas are respectively 8, is supported, and a rank is supported up to 8.

There is a desire for a method of preventing a space from being wasted excessively in a predetermined direction in a mobile communication system that uses a multi-antenna.

DETAILED DESCRIPTION OF THE INVENTION

Technical Problem

Therefore, the present disclosure has been made in view of the above-mentioned problems, and an aspect of the present disclosure is to provide a method and apparatus for determining, by an evolved node B (eNB), an approximate location of a user equipment (UE) based on a reception power report, and setting a codebook subset based on the determination, thereby reducing a burden of channel state reporting.

Technical Solution

In accordance with an aspect of the present disclosure, there is provided a feedback information receiving method by an evolved node B (eNB) in a mobile communication system, the method including: transmitting configuration information associated with at least one reference signal to a user equipment (UE); transmitting the at least one reference signal to the UE; transmitting, to the UE, feedback configuration information and reception power report configuration information based on the at least one reference signal; and receiving the feedback information from the UE at a predetermined time.

In accordance with an aspect of the present disclosure, there is provided a feedback information generating and reporting method by a UE in a mobile communication system, the method including: receiving configuration information associated with at least one reference signal from an eNB; receiving the at least one reference signal from the eNB; receiving feedback configuration information and reception power report configuration information based on the at least one reference signal from the eNB; estimating a channel, and transmitting feedback information to the eNB at a predetermined time.

In accordance with an aspect of the present disclosure, there is provided a feedback information generating and reporting apparatus in an eNB of a mobile communication system, the apparatus including: a transmitter that transmits configuration information associated with at least one reference signal, transmits the at least one reference signal to a UE, and transmits, to the UE, feedback configuration information and reception power report configuration information based on the at least one reference signal; and a receiver that receives feedback information from the UE at a predetermined time.

In accordance with an aspect of the present disclosure, there is provided a feedback information generating and reporting apparatus in a UE of a mobile communication system, the apparatus including: a receiver that receives configuration information associated with at least one reference signal from an eNB, receives the at least one reference signal from the eNB, and receives, from the eNB, feedback configuration information and reception power report configuration information based on the at least one reference signal; a controller that estimates a channel; and a transmitter that transmits feedback information to the eNB at a predetermined time.

MODE FOR CARRYING OUT THE INVENTION

Figure 1:
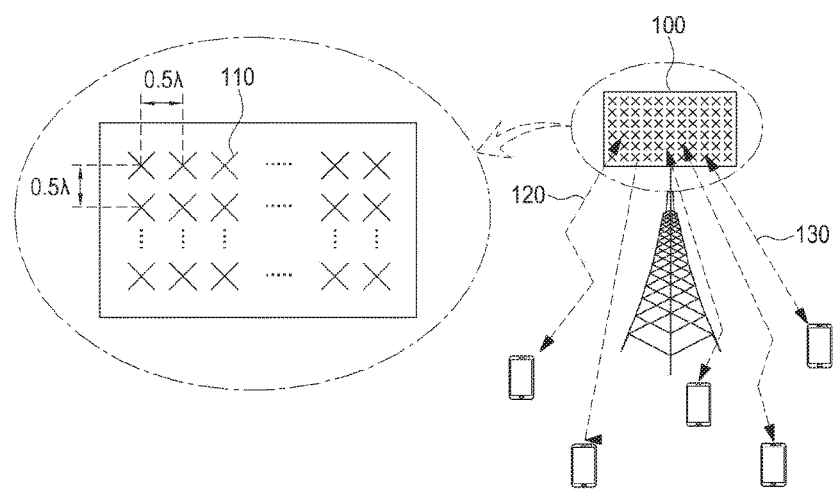
FIG. 1 is a diagram illustrating an FD-MIMO system.

Hereinafter, exemplary embodiments of the present disclosure will be described in detail with reference to the accompanying drawings. The same elements will be designated by the same reference numerals although they are shown in different drawings. Further, a detailed description of a known function and configuration which may make the subject matter of the present disclosure unclear will be omitted.

Further, terms or words used in the description and claims below should not be interpreted as only general or dictionary meanings, but interpreted as meanings and concepts satisfying the technical spirit of the present disclosure based on a principle in that the inventor can appropriately define his/her disclosure with a concept of the terms in order to describe the disclosure in the best method.

The terms used in this application is for the purpose of describing particular embodiments only and is not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

Further, the detailed description of embodiments of the present disclosure is made mainly based on a wireless communication system based on OFDM, particularly 3GPP EUTRA standard, but the subject matter of the present disclosure can be applied to other communication systems having a similar technical background and channel form after a little modification without departing from the scope of the present disclosure and the above can be determined by those skilled in the art.

Embodiments of the present disclosure provide: a method in which an evolved node B (eNB) transfers information associated with a CSI-RS and transmits a CSI-RS to a user equipment (UE) to effectively utilize array antennas deployed in two dimensions in an FD-MIMO system; a method in which a UE generates and reports a channel status feedback and reception power information; and a method in which an eNB utilizes channel status feedback and reception power information reported by a UE.

The present disclosure relates to a feedback transmitting/receiving method and apparatus in a mobile communication system, and relates to a feedback information transmitting method of a UE and the UE thereof, and a feedback receiving method of an eNB and the eNB thereof, the feedback information transmitting method including: receiving, from an eNB, configuration information associated with at least one reference signal and feedback configuration information for generating and reporting feedback information with respect to the at least one reference signal; receiving the at least one reference signal from the eNB; measuring the received at least one reference signal; generating feedback information based on a result of the measurement according to the feedback configuration information, and transmitting the generated feedback information to the base station.

An FD-MIMO system to which the technology provided in the present disclosure is applied may correspond to the case that uses a large number of transmission antennas greater than or equal to 8 or 64 or more transmission antennas, which has been advanced from the existing LTE/LTE-A MIMO technology.

FIG. 1 is a diagram illustrating an FD-MIMO system.

In FIG. 1, an eNB transmission equipment 100 transmits a radio signal through 8 or more transmission antennas. A plurality of transmission antennas may be deployed to maintain a minimum distance from one another, as shown in the diagram 110. An example of the minimum distance is the half of the wavelength of a transmitted radio signal. Generally, a distance corresponding to the half of the wavelength of a radio signal is maintained between transmission antennas, a signal transmitted from each transmission antenna may be affected by a radio channel having a low correlation.

When the band of a transmitted radio signal is 2 GHz, the distance may be 7.5 cm, and when the band becomes higher than 2 GHz, the distance becomes shorter.

In FIG. 1, 8 or more transmission antennas deployed in the eNB transmission equipment 100 may be utilized for transmitting a signal to one or a plurality of UEs as shown in the diagrams 120 and 130. An appropriate precoding is applied to a plurality of transmission antennas to enable the plurality of transmission antennas to transmit a signal in parallel to a plurality of UEs. In this instance, a single UE may receive one or more information streams. Generally, the number of information streams that a single UE may receive may be determined based on the number of reception antennas that the UE contains and a channel status.

To efficiently embody the FD-MIMO system, a UE may need to accurately measure a channel status and the scale of interference, and may need to transmit effective channel status information to an eNB using the measurement. The eNB that receives the channel status information may determine UEs to which a downlink transmission is to be executed, may determine a data transmission speed to be used for a downlink transmission, may determine precoding to be applied, or the like. The FD-MIMO system has a large number of transmission antennas and considers a two-dimensional antenna array, and thus, applying a method of transmitting/receiving channel status information associated with an LTE/LTE-A system designed by taking into consideration only a one-dimensional array transmission antenna including up to 8 transmission antennas may be inappropriate for the FD-MIMO system. In this instance, an additional piece of control information needs to be transmitted to achieve the same performance and an uplink overhead problem may occur.

Figure 2:
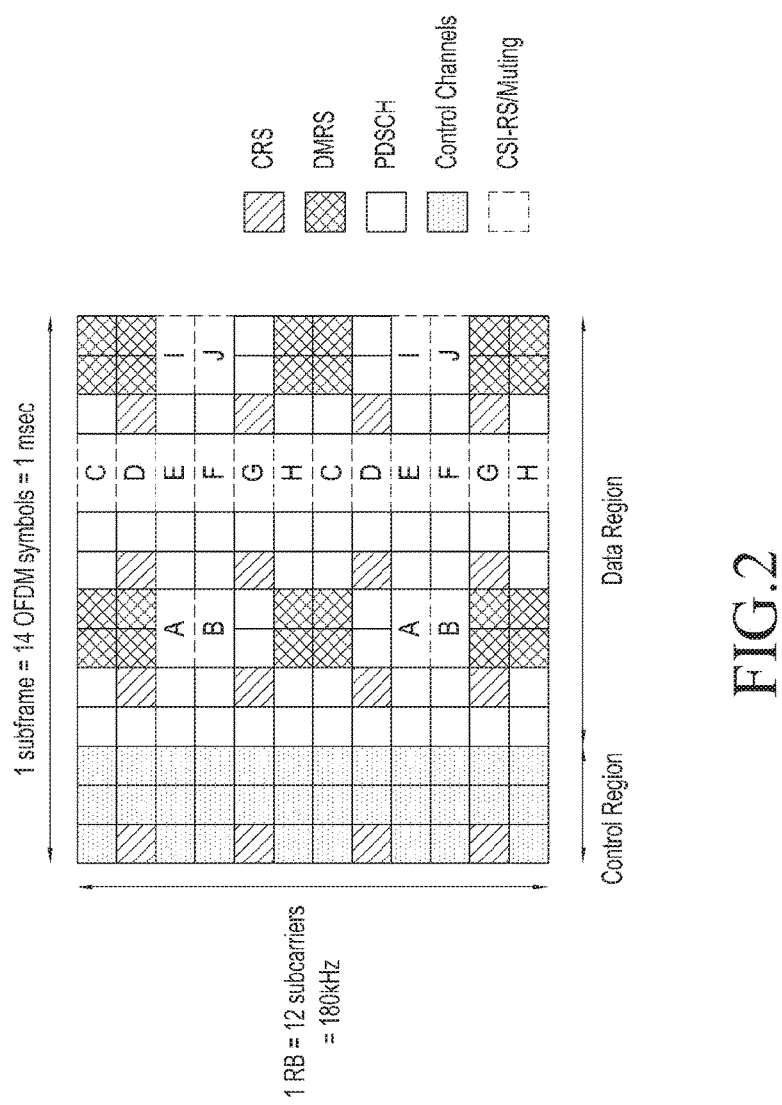
FIG. 2 is a diagram illustrating a radio resource corresponding to one subframe and one resource block (RB), which is a minimum unit for a downlink scheduling in an LTE/LTE-A system.

FIG. 2 is a diagram illustrating a radio resource corresponding to one subframe and one resource block (RB), which is a minimum unit for a downlink scheduling in an LTE/LTE-A system.

The radio resource of FIG. 2 is formed of one subframe in the time axis and one resource block (RB) in the frequency axis. The radio resource is formed of 12 subcarriers in the frequency domain and 14 OFDM symbols in the time domain, and thus, may have a total of 168 unique frequency and time positions. In the LTE/LTE-A system, each unique time-frequency position of FIG. 2 is referred to as a resource element (RE).

A plurality of different types of signals may be transmitted in the radio resource of FIG. 2. The plurality of different types of signals are as follows.

Cell specific RS (CRS): The CRS is a reference signal periodically transmitted for all UEs that belong to a single cell, and may be commonly used by a plurality of UEs.

Demodulation reference signal (DMRS): The DMRS is a reference signal transmitted for a specific UE, and is transmitted only when data is transmitted to the corresponding UE. The DMRS is formed of a total of 8 DMRS ports. In LTE/LTE-A, a port in a range of port 7 to port 14 corresponds to a DMRS port, and each port maintains orthogonality using code division multiple (CDM) or frequency division multiple (FDM) so as not to generate interference with each other.

Physical downlink shared channel (PDSCH): The PDSCH is a data channel transmitted in downlink, which is used when an eNB transmits traffic to a UE. The PDSCH is transmitted using an RE in which a reference signal is not transmitted in a data region of FIG. 2.

Channel status information reference signal (CSI-RS): The CSI-RS is a reference signal transmitted for UEs included in one cell, and is used for measuring a channel status. A plurality of CSI-RSs may be transmitted in a single cell. In the LTE-A system, a single CSI-RS may correspond to one, two, four, or eight antenna ports.

Other control channels (physical HARQ indicator channel (PHICH), physical control format indicator channel (PCFICH), physical downlink control channel (PDCCH)): Other channels may be used for transmitting control information required when a UE receives a PDSCH, or may be used for transmitting ACK/NACK to operate HARQ in association with an uplink data transmission.

In addition to the signals, the LTE-A system may configure muting such that a CSI-RS transmitted by another eNB can be received by UEs of a corresponding cell without interference. Muting may be applied to a location where a CSI-RS may be transmitted, and generally, a UE may skip a corresponding radio resource and receives a traffic signal. In the LTE-A system, muting is also referred to as a zero-power CSI-RS. According to the characteristic of muting, muting is equally applied to the location of a CSI-RS and a transmission power is not transmitted.

In FIG. 2, a CSI-RS may be transmitted using some of the locations expressed as A, B, C, D, E, E, F, G, H, I, and J, based on the number of antennas that transmit a CSI-RS. Also, muting may be applied to some of the locations expressed as A, B, C, D, E, E, F, G, H, I, and J. Particularly, a CSI-RS may be transmitted using two, four, or eight REs according to the number of transmission antenna ports. When the number of antenna ports is 2, a CSI-RS is transmitted in a half of a particular pattern in FIG. 2, or when the number of antenna ports is 4, a CSI-RS is transmitted in the entirety of a particular pattern. Alternatively, when the number of antenna ports is 8, a CSI-RS is transmitted using two patterns. Conversely, muting is always executed based on a single pattern. That is, muting may be applied to a plurality of patterns but may not be applied to some of a single pattern when the location does not overlap a CSI-RS. However, when the location of muting and the location of a CSI-RS overlap, muting may be applied to some of a single pattern.

When a CSI-RS associated with two antenna ports is transmitted, a signal of each antenna port is transmitted in two REs connected in time axis, and each antenna port signal may be distinguished by an orthogonal code. Also, when a CSI-RS associated with four antenna ports is transmitted, signals of additional two antenna ports may be transmitted by further using two REs based on the same manner as the CSI-RS for two antenna ports. This may be also applied to the case in which a CSI-RS associated with 8 antenna port is transmitted.

In a mobile communication system, an eNB needs to transmit a reference signal to a UE to measure a downlink channel status. In the case of the long term evolution advanced (LTE-A) system of the 3GPP, a UE measures a channel status between the UE and an eNB using a CRS or CSI-RS transmitted by the eNB. In association with the channel status, several factors need to be basically considered, and the amount of interference in a downlink may be included. The amount of interference in a downlink may include an interference signal generated by an antenna that belongs to a neighboring eNB, a thermal noise, and the like, which is important when the UE determines the channel status of the downlink. For example, when an eNB having a single transmission antenna transmits a UE having a single reception antenna, the UE needs to determine energy per symbol that the UE may receive in the downlink and the amount of interference to be received at the same time in a section where the UE receives a corresponding symbol, based on a reference signal received from the eNB, and needs to determine Es/Io. The determined Es/Io may be converted into a data transmission speed or a value corresponding thereto and may be reported to the eNB in the form of a channel quality indicator (CQI). Accordingly, the eNB may be capable of determining a data transmission speed to be used when transmitting data to the UE in the downlink.

In the case of the LTE-A system, a UE feeds back information associated with a channel status of a downlink to an eNB so that the eNB utilizes the same for downlink scheduling. That is, the UE may measure a reference signal transmitted by the eNB in the downlink, and may feed information extracted from the measured reference signal back to the eNB in the form defined by the LTE/LTE-A standards. In LTE/LTE-A, information fed back by a UE is briefly classified into three types of information as follows.

A rank indicator (RI) indicates the number of spatial layers that a UE may receive in a current channel status.

A precoder matrix indicator (PMI) is an indicator indicating a precoding matrix that a UE prefers in a current channel status.

A channel quality indicator (CQI) indicates a maximum data rate at which a UE may receive data in a current channel status. The CQI may be replaced with an SINR, a maximum error correction code rate, a modulation scheme, a data rate per frequency, and the like, which may be utilized to be similar to the maximum data rate.

The RI, PMI, and CQI are interrelated. For example, a precoding matrix supported in LTE/LTE-A may be defined to be different for each rank. Therefore, although the PMI value when the RI is 1 is equal to the PMI value when the RI is 2, they are interpreted to be different. Also, even when a UE determines a CQI, it is assumed that a rank value and a PMI value that the UE reports to an eNB are applied in the eNB. That is, when the UE reports RI_X, PMI_Y, and CQI_Z to the eNB, it indicates that the UE may receive a data transmission rate corresponding to CQI_Z when a rank is RI_X and a precoding is PMI_Y. As described above, when the UE calculates a CQI, the UE assumes a transmission scheme to be executed with respect to the eNB so that the UE may obtain an optimal performance when the UE actually executes transmission using the corresponding transmission scheme.

In LTE/LTE-A, a periodic feedback of the UE may be set to be one of the following four feedback modes or reporting modes based on information that is included.

Reporting mode 1-0: RI, wideband CQI (wCQI)
Reporting mode 1-1: RI, wCQI, PMI
Reporting mode 2-0: RI, wCQI, subband CQI (sCQI)
Reporting mode 2-1: RI, wCQI, sCQI, PMI For the four feedback modes, a feedback timing of each information may be determined based on $N_{pd}$, $N_{OFFSET,CQI}$, $M_{RI}$, and $N_{OFFSET,RI}$, and the like, which are transferred through a higher layer signal. In feedback mode 1-0, the transmission period of a wCQI corresponds to $N_{pd}$ subframes and a feedback timing may be determined based on a subframe offset value of $N_{OFFSET,CQI}$. The transmission period of an RI corresponds to $N_{pd} \cdot M_{RI}$ subframes, and the offset thereof is $N_{OFFSET,CQI} + N_{OFFSET,RI}$.

Figure 3:
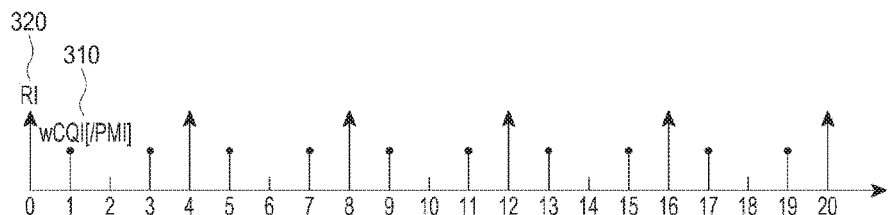
FIG. 3 is a diagram illustrating a feedback timing of an RI and a wCQI when $N_{pd}=2$, $M_{RI}=2$, $N_{OFFSET,CQI}=1$, and $N_{OFFSET,RI}=-1$.

FIG. 3 is a diagram illustrating a feedback timing of an RI and a wCQI when $N_{pd}=2$, $M_{RI}=2$, $N_{OFFSET,CQI}=1$, and $N_{OFFSET,RI}=-1$.

In FIG. 3, each timing in the vertical axis indicates a subframe index.

Feedback mode 1-1 has the same feedback timing as mode 1-0, but has a difference in that a wCQI and a PMI are transmitted together at a wCQI transmission timing with respect to the case of one antenna port, the case of two antenna ports, and some of the cases of four antenna ports.

The feedback period of an RI 320 may be a multiple of the feedback period of a wCQI 310.

In feedback mode 2-0, the feedback period of an sCQI corresponds to $N_{pd}$ subframes, and the offset value thereof is $N_{OFFSET,CQI}$. The feedback period of the wCQI 310 corresponds to $HEN_{pd}$ subframes, and the offset value thereof is $N_{OFFSET,CQI}$, which is the same as the offset value of an sCQI. Here, it is defined that H=JEK+1. K is transferred through a higher layer signal, and J is a value determined based on a system bandwidth. For example, J with respect to a 10 MHz system is defined as 3. Accordingly, a wCQI is transmitted every H transmissions of an sCQI, instead of the sCQI. The period of an RI corresponds to $M_{RI}EHEN_{pd}$ subframes, and the offset thereof is $N_{OFFSET,CQI}+N_{OFFSET,RI}$.

Figure 4:
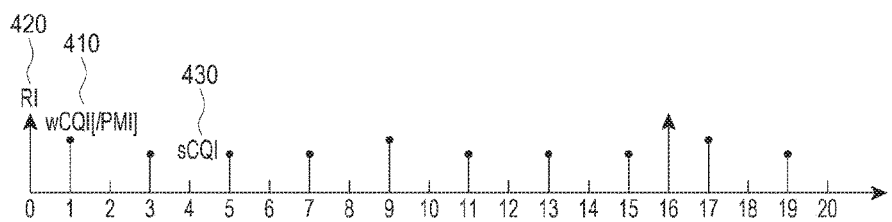
FIG. 4 is a diagram illustrating a feedback timing of an RI, an sCQI, and a wCQI when $N_{pd}=2$, $M_{RI}=2$, J=3(10 MHz), K=1, $N_{OFFSET,CQI}=1$, and $N_{OFFSET,RI}=-1$.

FIG. 4 is a diagram illustrating a feedback timing of an RI, an sCQI, and a wCQI when $N_{pd}$=2, $M_{RI}$=2, J=3(10 MHz), K=1, $N_{OFFSET,CQI}$=1, $N_{OFFSET,RI}$=−1.

The feedback period of an RI 420 may be a multiple of the feedback period of a wCQI 410 or the feedback period of an sCQI 430.

Feedback mode 2-1 has the same feedback timing as feedback mode 2-0, but has a difference in that a PMI is transmitted together at a wCQI transmission timing with respect to the case of one antenna port, the case of two antenna ports, and some of the cases of four antenna ports.

The described feedback timing is associated with the case in which the number of CSI-RS antenna ports is 1, the case in which the number of CSI-RS antenna ports is 2, or some of the cases in which the number of CSI-RS antenna ports is 4. In the case of a UE that is allocated with a CSI-RS associated with some other four antenna ports or eight antenna ports, two types of PMI information may be fed back, unlike the above feedback timing. When a UE is allocated with a CSI-RS having some other four antenna ports or eight antenna ports, feedback mode 1-1 may be divided into two sub-modes. In a first sub-mode, an RI is transmitted together with first PMI information. In a second sub-mode, a wCQI is transmitted together with second PMI information. Here, the feedback period of the wCQI and the second PMI and the offset thereof are defined as $N_{pd}$ and $N_{OFFSET,CQI}$, respectively. The feedback period of the RI and the first PMI information and the offset value thereof are defined as $M_{RI}EN_{pd}$ and $N_{OFFSET,CQI}+N_{OFFSET,RI}$, respectively. When the UE reports all of the first PMI (i1) and the second PMI (i2) to an eNB, the UE and the eNB may determine, as a precoding matrix preferred by the UE, a precoding matrix W (i1, i2) corresponding to a combination of the first PMI and the second PMI in a set (codebook) of precoding matrices, which is shared between the UE and the eNB. As another interpretation, when it is assumed that a precoding matrix corresponding to the first PMI is W1 and a precoding matrix corresponding to the second PMI is W2, the UE and the eNB may share information indicating that a precoding matrix preferred by the UE has been determined to be W1W2, which is a product of the two matrices.

When the feedback mode associated with 8 CSI-RS antenna ports is feedback mode 2-1, precoding type indicator (PTI) information may be added to the feedback information. In this instance, the PTI may be fed back together with an RI, and the feedback period is defined as $M_{RI}EHEN_{pd}$ subframes and the offset thereof is defined as $N_{OFFSET,CQI}+N_{OFFSET,RI}$.

Particularly, when the PTI is 0, the first PMI, the second PMI, and the wCQI are all fed back. In this instance, the wCQI and the second PMI are transmitted at the same timing, and the period and the offset thereof are given as $N_{pd}$ and $N_{OFFSET,CQI}$, respectively. The period of the first PMI is $H'EN_{pd}$, and the offset thereof is $N_{OFFSET,CQI}$. Here, H' is transferred through a higher layer signal.

Conversely, when the PTI is 1, the wCQI is transmitted together with a broadband second PMI and the sCQI is fed back together with a narrowband second PMI at a separate timing. In this instance, when the first PMI is not transmitted and the PTI is 0, the second PMI and the CQI are calculated by assuming a latest reported first PMI, and may be reported. The period and the offset of the PTI and the RI are the same as the case in which the PTI is 0. The period of the sCQI is defined as $N_{pd}$ subframes and the offset thereof is defined as $N_{OFFSET,CQI}$. The wCQI and the second PMI may be fed back based on a period of $HEN_{pd}$ and an offset of $N_{OFFSET,CQI}$. H is defined to be the same as the case in which the number of CSI-RS antenna ports is 2.

Figure 5:
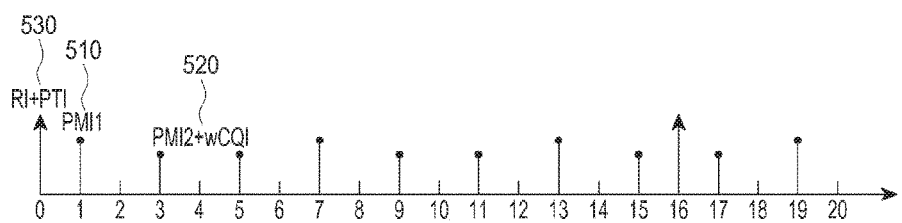
FIGS. 5 and 6 are diagrams illustrating a feedback timing for each of PTI=0 and PTI=1 when $N_{pd}=2$, $M_{RI}=2$, J=3(10 MHz), K=1, H'=3, $N_{OFFSET,CQI}=1$, and $N_{OFFSET,RI}=-1$.
Figure 6:
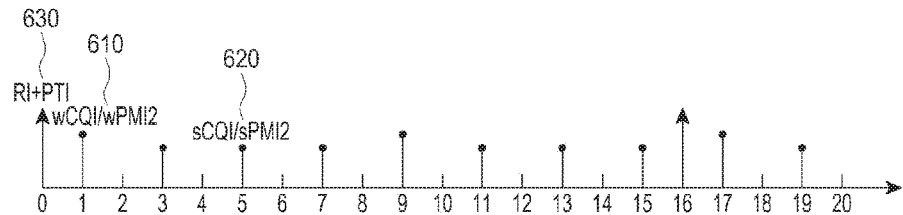

FIGS. 5 and 6 are diagrams illustrating a feedback timing for each of PTI=0 and PTI=1 when $N_{pd}$=2, $M_{RI}$=2, J=3(10 MHz), K=1, H'=3, $N_{OFFSET,CQI}$=1, and $N_{OFFSET,RI}$=−1.

In FIG. 5, the feedback period of an RI+PTI 530 may be a multiple of the feedback period of a PMI1 510 or the feedback period of a PMI2+wCQI 520.

In FIG. 6, the feedback period of an RI+PTI 630 may be a multiple of the feedback period of a wCQI/wPMI2 610 or the feedback period of a sCQI/sPMI2 620.

LTE/LTE-A may support an aperiodic feedback, in addition to a periodic feedback of a UE. When an eNB desires to obtain aperiodic feedback information of a predetermined UE, the eNB may configure an aperiodic feedback indicator included in downlink control information (DCI) for uplink data scheduling of the corresponding UE to execute a predetermined aperiodic feedback, and may execute uplink data scheduling of the corresponding UE. When the corresponding UE receives the indicator configured to perform an aperiodic feedback, at an $n^{th}$ subframe, the corresponding UE may perform an uplink transmission including aperiodic feedback information in a data transmission at an $n+k^{th}$ subframe. Here, k is a parameter defined in the 3GPP LTE Release 11 standard, which is 4 in the frequency division duplexing (FDD) and is defined as shown in Table 1 in the time division duplexing (TDD).

Table 1 shows a k value for each subframe number n in a TDD UL/DL configuration.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When the aperiodic feedback is configured, the feedback information may include an RI, PMI, and CQI in the same manner as the periodic feedback, and the RI and the PMI may not be fed back based on a feedback configuration. The CQI may include both a wCQI and an sCQI, or may include only wCQI information.

As described above, to efficiently embody the FD-MIMO system, a UE may need to accurately measure a channel status and the scale of interference, and may generate and transmit effective channel status information to an eNB using the measurement. The eNB that receives the channel status information may determine UEs to which a downlink transmission is to be executed, may determine a data transmission speed to be used for the downlink transmission, may determine precoding to be applied, or the like. The FD-MIMO system has a large number of transmission antennas and considers a two-dimensional antenna array, and thus, applying a method of transmitting/receiving channel status information associated with an LTE/LTE-A system designed by taking into consideration only one-dimensional array transmission antenna including up to 8 transmission antennas may be inappropriate for the FD-MIMO system. In this instance, an additional piece of control information needs to be transmitted to achieve the same performance and an uplink overhead problem may occur.

The present disclosure is derived to solve the above described problems, and provides a method and apparatus for measuring, by a UE, a wireless channel status (channel quality) and reception power information, generating channel status information, and transmitting the generated channel status information for an effective data transmission/reception in an FD-MIMO system that is based on an LTE-A system. Also, the present disclosure provides a method and apparatus for: setting, by an eNB, a main parameter for a UE so that the UE uses the parameter to generate/report channel state information; transmitting a corresponding reference signal, receiving channel status information transmitted by the UE; and transmitting data.

An eNB having a large number of transmission antennas, such as full dimension multiple input multiple output (FD-MMO), may excessively waste space in a predetermined direction when deploying antennas in one dimension, and thus, the eNB needs to consider a two-dimensional antenna array.

Figure 7:
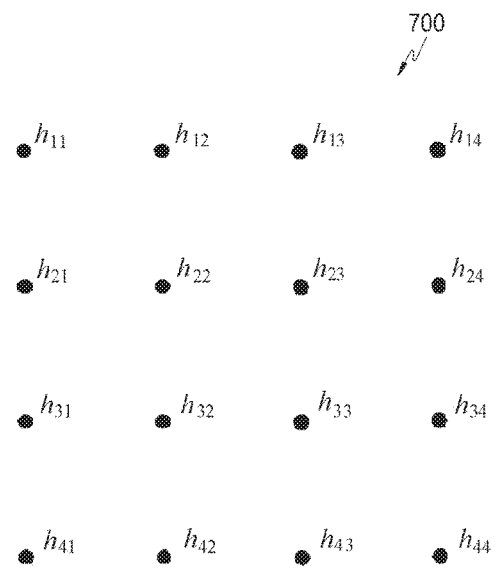
FIG. 7 is a diagram illustrating a method in which an eNB deploys 16 antenna ports in two-dimensions.

FIG. 7 illustrates a method in which an eNB deploys 16 antenna ports in two dimensions.

FIG. 7 illustrates a 4×4 two-dimensional antenna port deployment.

Embodiments of the present disclosure will describe a channel information transmission/reception and data transmission/reception method of an FD-MIMO system based on a situation in which 16 antenna ports are deployed in two dimensions, as shown in FIG. 7. However, the present disclosure may not be limited thereto, and may be applied to various two-dimensional deployment methods associated with 8, 16, 32, 64 antenna ports, or the like.

Also, points in FIG. 7 indicate virtual locations where the 16 antenna ports that an eNB operates are located. Although FIG. 7 illustrates the situation in which antenna ports are deployed in 4 by 4 in the vertical direction and the horizontal direction, a physical location, a phase, and a degree of virtualization of an antenna may be actually different for each embodiment made by an eNB. (Conventionally, only the horizontal direction has been considered.) In the example of FIG. 7, $h_{ij}$ indicates a channel value from an eNB transmission antenna located in an $i^{th}$ row and a $j^{th}$ column to a predetermined UE antenna. It is assumed that each reception antenna of a UE having multiple antennas has a separate channel value.

In the case of the two-dimensional antenna port deployment as shown in FIG. 7, when different precodings are applied to antennas deployed in the vertical direction, a signal transmitted to a UE may have a different directivity in the vertical direction. Conversely, when different precodings are applied to antennas deployed in the horizontal direction, a signal transmitted to a UE may have a different directivity in the horizontal direction.

Figure 8:
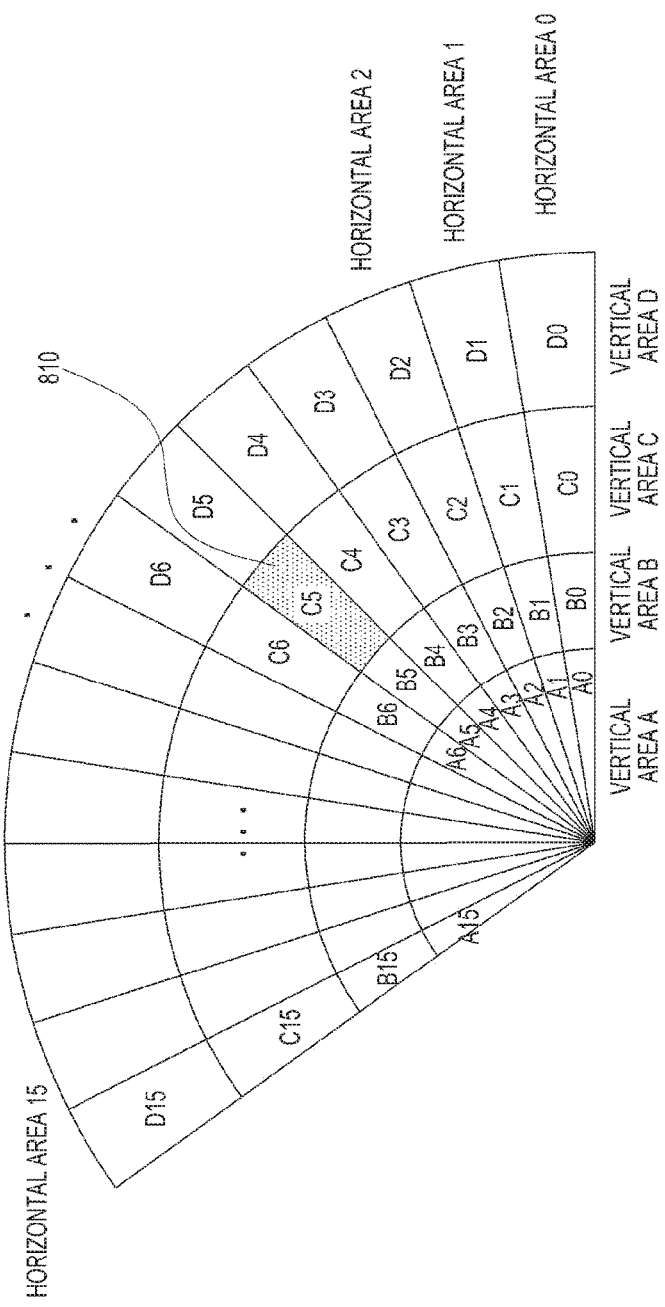
FIG. 8 is a diagram illustrating a predetermined cell area serviced by a predetermined eNB that is located in the center of a circumference, and uses a two-dimensional antenna port deployment.

FIG. 8 illustrates a predetermined cell area serviced by a predetermined eNB that is located in the center of a circumference and uses a two-dimensional antenna port deployment.

The precoding and the directivity of a signal will be described again with reference to FIG. 8. When an eNB of FIG. 8 applies four different precodings defined for antennas deployed in the vertical direction, signals may have directivities to vertical area A, vertical area B, vertical area C, and vertical area D, respectively, wherein the vertical areas are distinguished based on the vertical direction. When the eNB applies 16 different precodings defined for antennas deployed in the horizontal direction, signals may have directivities to horizontal area 0, horizontal area 1, horizontal area 2, . . . , and horizontal area 15, respectively, wherein the horizontal areas are distinguished based on the horizontal direction. Therefore, when a precoding is appropriately applied in both vertical direction/horizontal direction, an eNB that uses a two-dimensional antenna port deployment may generate a directivity of a signal to a cell area (e.g., C5 area 810) corresponding to a predetermined vertical direction/horizontal direction, and may transmit a signal having a better quality to UEs in the corresponding area.

For reference, the legacy LTE/LTE-A system designs a CSI-RS and available precoding matrices by assuming that an eNB has 2, 4, and 8 antenna ports deployed in only the horizontal direction. That is, when the eNB transmits, to a UE, a CSI-RS resource having as many REs as the number of antenna ports, the UE may estimate a channel from the antenna ports deployed in the horizontal direction, and may report, to the eNB, an RI/PMI, which is information corresponding to a preferred precoding matrix out of precoding matrices corresponding to horizontal area 0 to horizontal area 15, and CQI information corresponding thereto. The eNB may perform UE scheduling with respect to a corresponding cell by utilizing report information from various UEs, may determine a precoding and MCS information of the scheduled UE, and may transmit data based on the same. In other words, in the legacy LTE/LTE-A system, an eNB and a UE do not distinguish vertical areas in a predetermined cell when applying a precoding, but distinguish only horizontal areas and proceed with a data transmission/reception.

One method will be described that corrects a UE's feedback generation with respect to the horizontal direction and an eNB's operation in association therewith, which are performed in the legacy LTE/LTE-A, to be applied to an FD-MIMO that considers a two-dimensional antenna array. A UE may be assigned with a CSI-RS resource so that the UE is capable of estimating a channel with respect to all antenna ports deployed in the vertical direction and the horizontal direction, and the UE may report, to an eNB, a PMI associated with a precoding matrix corresponding to a horizontal/vertical area. Therefore, the eNB may utilize precoding matrix information corresponding to the corresponding horizontal/vertical area and CQI information thereof, and may transmit data by applying a precoding matrix associated with the horizontal/vertical direction corresponding to the corresponding area. The PMI of the precoding matrix corresponding to the vertical/horizontal area may correspond to a predetermined precoding matrix in a set (codebook) of precoding matrices associated with a previously designed two-dimensional antenna array.

In other words, FIG. 8 is a method in which a UE and an eNB agree on a newly designed two-dimensional codebook corresponding to 64 areas including A0~ A15, B0~ B15, C0~ C15, and D0~ D15, and the UE measures a CSI-RS and reports an index corresponding to a preferred precoding matrix to the eNB.

Under the situation of the 4×4 two-dimensional antenna port deployment of FIG. 7, the FD-MIMO operation that considers the above described two-dimensional antenna array will be described. A UE may be assigned with a CSI-RS through which a channel associated with 16 antenna ports may be measured. Subsequently, the UE may estimate the channel from 16 transmission antennas measured through the CSI-RS, may determine a precoding matrix that is the most appropriate for the measured channel in the codebook agreed between the eNB and the UE, and may report, to the eNB, an RI/PMI and CQI information corresponding thereto. The method may be considered as a natural extension of an operation method of the legacy LTE/LTE-A, which considers only one-dimensional antenna array, to a two-dimensional antenna array, in view of the fact in which the UE is capable of measuring a downlink channel with respect to all antenna ports of the eNB, directly generates precoding information using the measurement, and reports the same to the eNB. However, the UE needs to generate precoding information associated with both the horizontal direction and vertical direction, and needs to report the same to the eNB. Accordingly, when compared to the conventional method, the complexity of generating an RI/PMI of the UE increases to a square number of the conventional complexity, and the total number of PMI feedback bits may increase by twice the conventional method, which is a drawback.

The present disclosure provides embodiments associated with a new eNB and UE operation that requires a lower PMI generation complexity and a lower number of feedback bits from the UE, when compared to the FD-MIMO operation that considers the above described two-dimensional antenna array.

Embodiment: Scheme of Decreasing Complexity of Feedback Using RI/PMI Restriction As a method of operating an FD-MIMO system that considers a two-dimensional antenna array with a low RI/PMI generation complexity and a low number of PMI feedback bits, an eNB allocates a subset of available precoding matrices to a UE, and the UE searches for an optimal precoding matrix from the corresponding subset and reports a corresponding RI/PMI together with a CQI.

The method will be described in detail based on the situation of FIG. 7 and FIG. 8. The UE needs to select an optimal precoding matrix from among 64 available rank-1 precoding matrices corresponding to A0, A1, . . . , A15, B0, B1, . . . , B15, C0, C1, . . . , C15, D0, D1, . . . , D15. The UE may have a complexity of selecting an optimal precoding matrix out of 64 precoding matrices, and may need to report information associated with the selected optimal precoding matrix to the eNB by using a 6-bit PMI. The 6-bit PMI includes a 4-bit PMI indicating the horizontal direction from horizontal area 0 to horizontal area 15, and 2 bits indicating the vertical direction from vertical area A to vertical area D, and as the number of available precoding matrices increases in the horizontal direction and the vertical direction, the number of feedback bits increases. To prevent the number of PMI bits and the PMI generation complexity from increasing, the eNB and the UE restrict the number of PMI bits to 4 bits, and the eNB sets, for the UE, 16 precoding matrices to be used by the UE during a long time section, so that the UE may generate/report feedback information by taking into consideration only the set 16 precoding matrices. For example, when the eNB determines the vertical location of the UE as section A, the eNB sets the UE to consider only the precoding matrices corresponding to the section, and the UE needs to select an optimal precoding matrix out of only the precoding matrices corresponding to A0, A1, . . . , and A15, and reports a 4-bit PMI to the eNB. Here, as a method in which the eNB sets the UE to consider only the precoding matrices corresponding to section A, bitmap information corresponding to each precoding matrix may be utilized or a list of corresponding precoding matrices may be directly provided to the UE. In the case of using the bitmap information, the precoding matrices corresponding to section A may be expressed as a 64-bit bitmap by setting first 16 precoding matrices to be turned on and setting the remaining precoding matrices to be turned off, as shown in (1, 1, 1, 1, 1, 1, 1, 1, 1, 1, 1, 1, 1, 1, 1, 1, 0, 0, 0, . . . , 0). When the eNB determines that the location of the UE is included in area 0 to area 4 in the horizontal direction, the eNB may set a bitmap or a list for the UE so that the UE considers only the precoding matrices corresponding to A0, A1, A2, A3, B0, B1, B2, B3, C0, C1, C2, C3, D0, D1, D2, and D3.

The above described method in which the eNB allocates a subset of precoding matrices to the UE, and the UE selects/reports an optimal precoding matrix out of the precoding matrices will be described through generalization. By assuming that the eNB and the UE agree on precoding matrices corresponding to M vertical directions and N horizontal directions, the eNB selects L precoding matrices out of all precoding matrices corresponding to a corresponding (log 2M+log 2N) bit and sets a corresponding subset for the UE, so that the UE generates and reports a PMI by taking into consideration only the precoding matrices corresponding to a log 2L bit, wherein the entire feedback complexity and the amount of feedback bits may be limited to a L bit. Here, the method in which log 2L<(log 2M+log 2N) and the eNB sets an L precoding matrix for the UE may be a bitmap scheme or a scheme of setting each list.

To appropriately operate the method in which the eNB allocates, to the UE, a subset of available precoding matrices, and the UE searches for an optimal precoding matrix in the corresponding subset and reports a corresponding RI/PMI together with a CQI, a method of estimating, by the eNB, an approximate location of the UE may be needed. When the eNB is capable of determining an approximate location of a predetermined UE, the eNB may appropriately allocate a subset of precoding matrices corresponding to the corresponding location for the generation of a PMI of the UE.

To enable the eNB to determine an approximate location of a UE, the present disclosure considers a method in which the UE reports, to the eNB, a reception power after a precoding is applied to a predetermined CSI-RS. That is, when the eNB allocates, to the UE, a CSI-RS resource through which a channel associated with a two-dimensional antenna array may be measured, together with a set of precoding vectors to be used for calculating a reception power by applying the same to the corresponding CSI-RS resource, the UE may report, to the eNB, a reception power value obtained by applying a corresponding precoding vector to a channel matrix measured through the CSI-RS. The eNB may determine the intensity of a reception power of the UE in association with each precoding vector that is applied, and thus, the eNB may be capable of recognizing an approximate location of the UE. With reference to FIGS. 7 and 8, when the eNB determines an operation of a UE at the initial stage of access with respect to a predetermined UE and determines that the UE is located in vertical area C or vertical area D, the eNB allocates a CSI-RS associated with two-dimensional array antennas together with precoding vectors corresponding to C0~C15 and D0~D15, and instructs the UE to report each reception power to which a corresponding precoding vector is applied. The UE may calculate a reception power by applying each of the 32 precoding vectors to a channel matrix measured through the CSI-RS, and may report the power values to the eNB. The eNB may determine an approximate location of the UE through the 32 power report values, determine a subset of precoding matrices to be used for generating an RI/PMI/CQI, and allocate the same to the UE. Here, it is utilized that the process of calculating a reception power of a UE is simpler than the process of calculating an RI/PMI/CQI, and the corresponding reception power is controlled to be reported based on a significantly long period so that the reception power report is used only for recognizing the approximate location of the UE.

A method in which the UE calculates a reception power value P by applying a predetermined precoding vector b to a channel matrix measured through a CSI-RS may be expressed by Equation 1.

$$P = \frac{1}{N_{rx}} \sum_{i=1}^{N_{rx}} |h_i^T b|^2 \quad \text{[Equation 1]}$$

In Equation 1, $N_{rx}$ denotes the number of reception antennas of a UE. $h_i$ is a channel vector associated with two-dimensional array antenna ports measured in an $i^{th}$ reception antenna, and channel values of FIG. 7 may be expressed by Equation 2.

$$h_i = [h_{11}, \ldots, h_{41}, h_{12}, \ldots, h_{42}, \ldots, h_{14}, \ldots, h_{44}]^T \quad \text{[Equation 2]}$$

Figure 9:
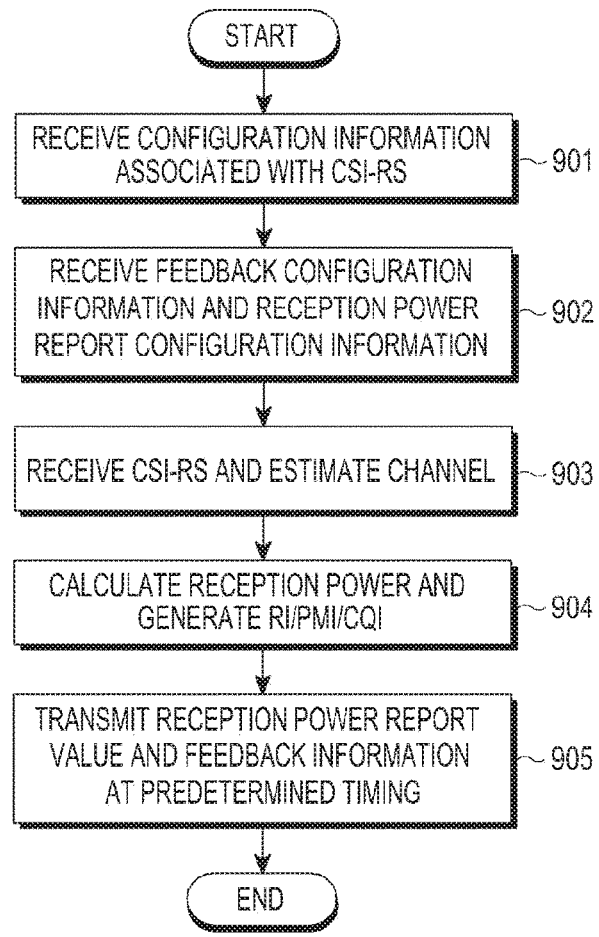
FIG. 9 is a flowchart illustrating an operation process in which a UE generates/reports feedback information according to an embodiment of the present disclosure.

FIG. 9 is a flowchart illustrating an operation process in which a UE generates/reports feedback information according to an embodiment of the present disclosure.

Referring to FIG. 9, a UE receives configuration information of a CSI-RS to be used for channel estimation in operation 910. Here, based on the received configuration information, the UE determines all or some out of: the total number of ports associated with each CSI-RS; a timing and a location of a resource where a CSI-RS is transmitted; sequence information; transmission power information; and information associated with precoding vectors to be applied to a CSI-RS to calculate a reception power. Subsequently, in operation 920, the UE determines reception power report configuration information and feedback configuration in association with a channel measured thorough the CSI-RS configured in operation 910. Here, the feedback configuration according to an embodiment of the present disclosure may include all or some out of: information indicating a CSI-RS and an interference resource, which are related to a corresponding feedback; a feedback mode; timing information; and information associated with a subset of precoding matrices. Also, the reception power report configuration information includes information associated with a reception power report timing. Subsequently, the UE receives a CSI-RS, estimates a channel, and obtains a channel matrix in operation 930, and the UE calculates a reception power by applying precoding vectors or precoding matrices in which the received CSI-RS is configured, and generates an RI/PMI/CQI in operation 940. In operation 950, the UE transmits the reception power report value and feedback information to the eNB at a corresponding timing based on the configuration of the eNB, and terminates the channel feedback generating and reporting process.

Figure 10:
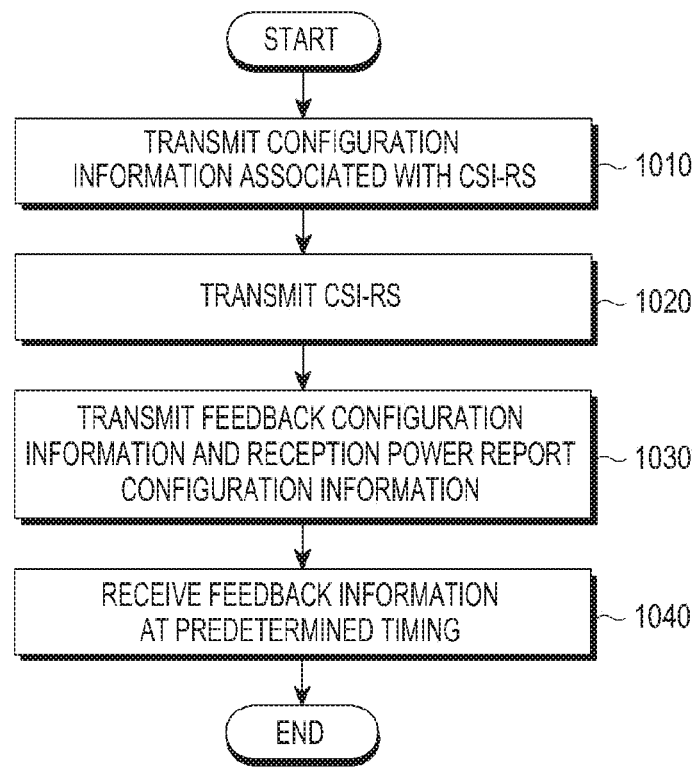
FIG. 10 is a flowchart illustrating an operation process of an eNB according to an embodiment of the present disclosure.

FIG. 10 is a flowchart illustrating an operation process of an eNB according to an embodiment of the present disclosure.

Referring to FIG. 10, the eNB transmits configuration information associated with a CSI-RS in operation 1010. Here, the configuration information associated with the CSI-RS may include information associated with precoding vectors to be applied to a reception power reporting process. Subsequently, the eNB transmits a CSI-RS in operation 1020, transmits feedback configuration information and reception power report configuration information based on the CSI-RS in operation 1030, receives a reception power report and feedback information from a UE in operation 1040, and utilizes the same to determine a channel status between the UE and the eNB.

Figure 11:
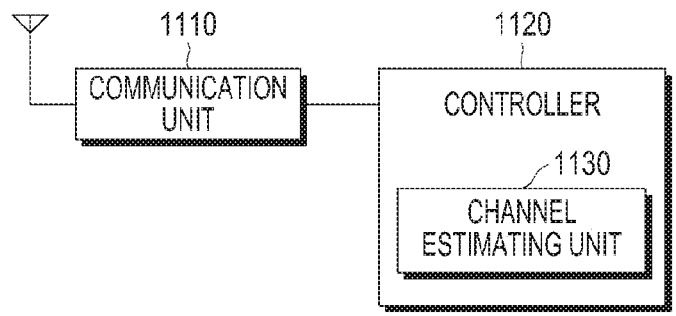
FIG. 11 is a block diagram illustrating an internal structure of a UE according to embodiments of the present disclosure.

FIG. 11 is a block diagram of an internal structure of a UE according to an embodiment of the present disclosure.

Referring to FIG. 11, a UE includes a communication unit 1110 and a controller 1120.

The communication unit 1110 may perform a function of transmitting or receiving a CSI-RS, control information, and data to/from the outside (e.g., an eNB). Here, the communication unit 1110 may transmit reception power information and feedback information to the eNB for the FD-MIMO technology under the control of the controller 1120.

The controller 1120 controls statuses and operations of all elements included in the UE. Particularly, the controller 1120 may generate the reception power information and feedback information for FD-MIMO, according to information received from the eNB. Also, the controller 1120 may control the communication unit 1110 to feed back, to the eNB, generated channel information based on timing information assigned from the eNB. To this end, the controller 1120 may be configured to include a channel estimating unit 1130.

The channel estimating unit 1130 may determine required reception power information and feedback information through a CSI-RS and feedback allocation information received from the eNB, and may estimate a channel using the received CSI-RS.

Although FIG. 11 has described the example in which the UE includes the communication unit 1110 and the controller 1120, the present disclosure may not be limited thereto, and may further include various configurations based on a function executed in the UE. For example, the UE may include a display unit for displaying a current state of the UE, an input unit through which a signal for the execution of a function is input by a user, and a storage unit for storing data generated in the UE. Also, although it is illustrated that the controller 1120 and the channel estimating unit 1130 are configured as separate blocks, they may not be limited thereto. For example, the controller 1120 may perform a function that the channel estimating unit 1130 performs.

In this instance, the controller 1120 may control the communication unit 1110 to receive configuration information associated with each reference signal from the eNB.

Also, the controller 1120 may control the communication unit 1110 to measure a reference signal and to receive, from the eNB, configuration information for generating reception power information and feedback information based on the measurement.

The controller 1120 may measure a reference signal and may generate a reception power value and feedback information based on the configuration information, through the communication unit 1110. The controller 1120 may control the communication unit 1110 to transmit, to the eNB, the generated reception power value and the feedback information at a timing based on the configuration information.

Figure 12:
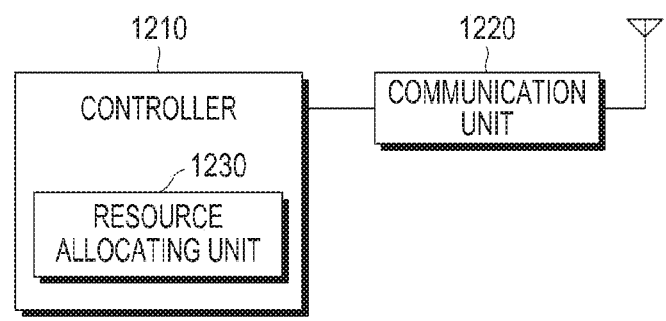
FIG. 12 is a block diagram illustrating an internal structure of an eNB according to embodiments of the present disclosure.

FIG. 12 is a block diagram illustrating an internal structure of an eNB according to an embodiment of the present disclosure. Referring to FIG. 12, an eNB may include a controller 1210 and a communication unit 1220.

The controller 1210 controls statuses and operations of all elements included in the eNB. Particularly, the controller 1210 may allocate, to a UE, precoding configuration information and a CSI-RS resource for the channel estimation, and may allocate a report resource and a timing to the UE. To this end, the controller 1210 may further include a resource allocating unit 1230.

The resource allocating unit 1230 may allocate a CSI-RS to each resource to enable a UE to estimate a channel with respect to multiple antennas, and may transmit a CSI-RS using a corresponding resource. Also, the resource allocating unit 1230 may allocate a timing to avoid the collision of power reports and feedbacks transmitted from multiple UEs, and may receive and interpret configured information at a corresponding timing.

The communication unit 1220 may perform a function of transmitting/receiving data, a reference signal, and feedback information to/from a UE. Here, the communication unit 1220 transmits a CSI-RS to the UE through an allocated resource under the control of the controller 1210, and receives channel information from the UE.

Although the above descriptions illustrate that the controller 1210 and the resource allocating unit 1230 are configured as separate blocks, they may not be limited thereto. For example, the controller 1210 may perform a function that the resource allocating unit 1230 performs.

In this instance, the controller 1210 may control the communication unit 1220 to transmit configuration information associated with a reference signal to a UE. Also, the controller 1210 may control the communication unit 1220 to transmit, to the UE, the configuration information used for generating reception power and feedback information based on a measurement result.

Also, the controller 1210 may control the communication unit 1220 to transmit a reference signal to the UE, and to receive channel information transmitted from the UE at a timing based on the feedback configuration information.

According to the present disclosure, an eNB may determine an approximate location of a UE based on a reception power report and may set a codebook subset based on the determination, thereby reducing a burden of channel state reporting.

It may be recognized that a channel information generating and reporting method and apparatus in a mobile communication system according to an embodiment of the present disclosure may be embodied in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. A method of generating and reporting channel information in a mobile communication system according to an embodiment of the present disclosure may be implemented by a computer or portable terminal including a controller and a memory, and the memory is one example of a program including instructions for realizing the embodiments of the present disclosure or a machine-readable storage medium suitable for storing programs.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Also, a channel information generating and reporting apparatus in a mobile communication system according to an embodiment of the present disclosure may receive a program from a program providing device that is wirelessly or wiredly connected thereto, and may store the program. The program providing device may include: a program including instructions to perform a channel information generating and reporting method in a mobile communication system in which the program processing device is configured in advance; a memory that stores information required for a channel information generating and reporting method in a mobile communication system; a communication unit that performs wired or wireless communication with the program processing device; and a controller that transmits a corresponding program to a transmitting/receiving device automatically or by request from the program processing device.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method of receiving feedback information by an evolved node B (eNB) in a wireless communication system, the method comprising:
   transmitting configuration information associated with at least one reference signal to a user equipment (UE), wherein the configuration information associated with at least one reference signal comprises information associated with at least one precoding vector;
   transmitting the at least one reference signal to the UE;
   transmitting feedback configuration information and reception power report configuration information to the UE; and
   receiving, from the UE, feedback information based on the feedback configuration information and a reception power report based on the reception power report configuration information,
   wherein the feedback information and the reception power report are generated based on the at least one reference signal and the at least one precoding vector, respectively.

2. The method of claim 1, wherein the at least one reference signal denotes a channel status information reference signal (CSI-RS).

3. The method of claim 1, wherein a codebook subset comprising the at least one precoding vector is allocated based on the reception power report configuration information.

4. The method of claim 3, wherein the codebook subset is determined by selecting a predetermined precoding matrix from among all or some precoding matrices corresponding to M vertical directions and N horizontal directions, and
   wherein the all or some precoding matrices corresponding to the M vertical directions and the N horizontal directions are defined in advance by the eNB and the UE.

5. A method of transmitting feedback information by a UE in a wireless communication system, the method comprising:
   receiving configuration information associated with at least one reference signal from an evolved node B (eNB), wherein the configuration information associated with at least one reference signal comprises information associated with at least one precoding vector;
   receiving the at least one reference signal from the eNB;
   receiving feedback configuration information and reception power report configuration information from the eNB;
   generating feedback information and a reception power report based on the at least one reference signal and the at least one precoding vector, respectively; and
   transmitting, to the eNB, the feedback information based on the feedback configuration information and the reception power report based on the reception power report configuration information.

6. The method of claim 5, wherein the at least one reference signal denotes a channel status information reference signal (CSI-RS).

7. The method of claim 5, wherein a codebook subset comprising the at least one precoding vector is allocated based on the reception power report configuration information.

8. The method of claim 7, wherein the codebook subset is determined by selecting a predetermined precoding matrix from among all or some precoding matrices corresponding to M vertical directions and N horizontal directions, and
   wherein the all or some precoding matrices corresponding to the M vertical directions and the N horizontal directions are defined in advance by the eNB and the UE.

9. An apparatus for receiving feedback information in an evolved node B (eNB) of a wireless communication system, the apparatus comprising:
   a transceiver; and
   a controller coupled with the transceiver and configured to:
      transmit configuration information associated with at least one reference signal to a user equipment (UE), wherein the configuration information associated with at least one reference signal comprises information associated with at least one precoding vector,
      transmit the at least one reference signal to the UE,
      transmit feedback configuration information and reception power report configuration information to the UE, and
      receive, from the UE, feedback information based on the feedback configuration information and receive a reception power report based on the reception power report configuration information,
   wherein the feedback information and the reception power report are generated based on the at least one reference signal and the at least one precoding vector, respectively.

10. The apparatus of claim 9, wherein the at least one reference signal denotes a channel status information reference signal (CSI-RS).

11. The apparatus of claim 9, wherein a codebook subset comprising the at least one precoding vector is allocated based on the reception power report configuration information.

12. The apparatus of claim 11, wherein the codebook subset is determined by selecting a predetermined precoding matrix from among all or some precoding matrices corresponding to M vertical directions and N horizontal directions, and
   wherein the all or some precoding matrices corresponding to the M vertical directions and the N horizontal directions are defined in advance by the eNB and the UE.

13. An apparatus for transmitting feedback information in a user equipment (UE) of a wireless communication system, the apparatus comprising:
   a transceiver; and
   a controller coupled with the transceiver and configured to:
      receive configuration information associated with at least one reference signal from an evolved node B (eNB), wherein the configuration information associated with at least one reference signal comprises information associated with at least one precoding vector,
      receive the at least one reference signal from the eNB,
      receive feedback configuration information and reception power report configuration information from the eNB,
      generate feedback information and a reception power report based on the at least one reference signal and the at least one precoding vector, respectively, and
      transmit, to the eNB, the feedback information based on the feedback configuration information and the reception power report based on the reception power report configuration information.

14. The apparatus of claim 13, wherein the at least one reference signal comprising a channel status information reference signal (CSI-RS).

15. The apparatus of claim 13, wherein the codebook subset comprising the at least one precoding vector is allocated based on the reception power report configuration information.

16. The apparatus of claim 15, wherein the codebook subset is determined by selecting a predetermined precoding matrix from among all or some precoding matrices corresponding to M vertical directions and N horizontal directions, and
   wherein the all or some precoding matrices corresponding to the M vertical directions and the N horizontal directions are defined in advance by the eNB and the UE.

* * * * *